United States Patent [19]

Toro et al.

[11] Patent Number: 5,190,900

[45] Date of Patent: Mar. 2, 1993

[54] PROCESS FOR REMOVING IRON FROM KAOLIN, QUARTZ AND OTHER MINERAL CONCENTRATES OF INDUSTRIAL INTEREST

[75] Inventors: Luigi Toro, Rome; Anna Maria Marabini, Frascati; Bruno Paponetti, Coppito; Bruno Passariello, Tivoli, all of Italy

[73] Assignee: Consiglio Nazionale Delle Ricerche, Rome, Italy

[21] Appl. No.: 770,359

[22] Filed: Oct. 3, 1991

[30] Foreign Application Priority Data

Oct. 11, 1990 [IT] Italy .............................. 21707 A/90

[51] Int. Cl.$^5$ ................. C04B 33/02; C04B 33/04; C04B 33/10; C04B 14/04
[52] U.S. Cl. ................................. 501/148; 501/146; 501/150; 501/145; 106/416; 106/486; 106/487; 106/488
[58] Field of Search ............. 106/416, 486, 488; 501/145, 146, 144, 150

[56] References Cited

U.S. PATENT DOCUMENTS

| | | | |
|---|---|---|---|
| 3,193,344 | 3/1962 | Iannicelli et al. | 23/110 |
| 3,320,027 | 5/1967 | Maynard et al. | 23/110 |
| 3,414,422 | 12/1968 | Iannicelli et al. | 106/288 |
| 4,088,732 | 5/1978 | Maynard et al. | 423/122 |
| 4,943,324 | 7/1990 | Bundy et al. | 106/486 |

FOREIGN PATENT DOCUMENTS

| | | | |
|---|---|---|---|
| 0776173 | 1/1968 | Canada | 501/146 |
| 0407855 | 12/1973 | U.S.S.R. | 501/146 |
| 0002691 | of 1859 | United Kingdom | 501/146 |

Primary Examiner—Mark L. Bell
Assistant Examiner—Michael Marcheschi
Attorney, Agent, or Firm—Oliff & Berridge

[57] ABSTRACT

A chemical process is described for removing ferric iron present in submarginal quantities in concentrates of kaolin, quartz, titanium minerals, ceramic minerals for glass, paper and electronics use and other materials of industrial interest by which ferric iron is reduced to ferrous iron using acid solutions, possibly in the presence of low concentrations of sugars containing 5 or more carbon atoms.

13 Claims, No Drawings

PROCESS FOR REMOVING IRON FROM KAOLIN, QUARTZ AND OTHER MINERAL CONCENTRATES OF INDUSTRIAL INTEREST

FIELD OF THE INVENTION

A process for bleaching kaolin, quartz, titanium minerals, ceramic minerals for glass, paper and electronics use and other like materials containing ferric iron is described in which the mineral is suspended in water at acid pH, a sugar is possibly added to the suspension, the suspension is kept stirred with or without heating, and the residue is finally collected by filtration and dried.

STATE OF THE ART

The removal of ferric iron contained in small quantities in materials such as kaolin, quartz, titanium minerals, ceramic minerals for glass, paper and electronics use and other like materials, with their consequent bleaching, is commonly achieved either by physical separations such as magnetic separation, flotation etc., or by redox chemical processes. The reagent commonly used for chemical bleaching of kaolins and other stated like materials is sodium hydrosulphite ($Na_2S_2O_4$) in a sulphuric acid medium (pH<3).

The $Fe^{+++}$ is reduced to $Fe^{++}$ and hence solubilized as $FeSO_4$, which is then removed by pressure filtration (see in this respect FR-A-2030730; U.S. Pat. No. 3,528,759; RO-A-49334; SU-A-485093; SU-A-628087; "Formation of aggressive substance in East German caolins", Silikattechnik (81) p. 262-5, Vol. 32, No. 9).

However with these processes in most cases it is not possible to obtain high-quality products because the hydrosulphite is unable to reduce all the iron, which is present in the form of various chemical compositions so that, for example, the degree of whiteness obtainable with a kaolin by these methods is about 85-88%.

DETAILED DESCRIPTION OF THE INVENTION

The present invention enables the iron present as ferric iron ($Fe^{3+}$) in the material for bleaching to be eliminated by making it totally soluble and hence removable by washing, to enable a degree of whiteness of greater than 90% and up to 96% to be obtained, this result being clearly superior to those obtainable with the aforesaid methods. This result is obtained by treating in an acid environment those minerals coloured with small quantities of iron-containing minerals in which the iron oxidation level is 3+. The possible addition of sugars to the solution facilitates said reduction process by allowing any ferric iron present either as iron sesquioxide or as jarosite to be reduced, and by maintaining the iron in ferrous form and hence more soluble by virtue of its greater solubility compared with the corresponding oxidized metal form, this being a very interesting aspect in the liquid/solid separation stage.

The mechanism of the process according to the invention can be schematized by the following reactions:

1) $\frac{2}{3}A[Fe_3(SO_4)_2(OH)_6] + \frac{5}{3}SO_4{}^{2-} + H^+ \rightarrow Fe(OH)_3 + Fe(SO_4)_2{}^- + H_2O + \frac{2}{3}A^+$ where $A^+$ can be $K^+$, $Na^+$, $NH_4{}^+$ and $H^+$.

2) $24\ Fe^{3+} + C_6H_{12}O_6 + 6H_2O \rightarrow 24\ Fe^{2+} + 6CO_2 + 24H^+$

3) $C_6H_{12}O_6 + 12\ Fe_2O_3 + 48H_+ \rightarrow 24\ Fe^{2+} + 30H_2O + 6CO_2$ The process according to the invention also enables industrial wastes containing sugar, such as spent milk whey, beet molasses etc., to be used as reagents, these not only being of low cost but often representing undesirable and/or dangerous waste products which would otherwise have to be subjected to complex inserting processes.

EXPERIMENTAL PART

The process according to the present invention is conducted by treating the material to be bleached with an aqueous acid solution in which the acid concentration is between 0.1 and 4M at a temperature of between 20° C. and 120° C. for a time of up to 48 hours. The content of the material to be bleached is between 4 and 35%. The acids usable in the process of the invention are HCl, $H_2SO_4$, $H_3PO_4$ etc.

In a preferred version of the process according to the present invention a sugar is added to the acid solution in a concentration of 0.5-4 g/l.

Sugars usable in the process of the present invention include for example: saccharose, fructose, arabinose etc. In addition, as stated, sugar mixtures such as those represented by beet molasses, spent milk whey etc. are of interest provided they enable a sugar concentration of the aforesaid value to be obtained.

The liquid phase, separated by centrifuge, is analyzed for iron content by ICP. The solid residue, suitably dried, is tested to determine the degree of whiteness by firing the sample in a Seger No. 8 cone; two buttons of each sample were obtained by casting in plaster moulds, the whiteness index is determined with a Photovolt Reflection Meter 670, using a green filter ($\lambda = 550\ \mu m$).

Details and advantages of the process according to the present invention will be more apparent from the examples given hereinafter for the purposes of non-limiting illustration.

Table 1 shows the characteristics of the kaolin treated by the process of the present invention.

TABLE 1

Characteristics of the kaolin used in the bleaching process
Degree of whiteness: 85%

| Average chemical analysis STANDARD | | Average particle size composition | |
|---|---|---|---|
| | | ISO 565 microns | Cumulative residue |
| L.O.C. | 8.5 + 0.1 | | |
| $SiO_2$ | 64.7 + 0.8 | 60 | 1% |
| $Al_2O_3$ | 24.5 + 0.2 | 30 | 5% |
| $Fe_2O_3$ | 0.8 + 0.1 | 10 | 22% |
| $TiO_2$ | 0.34 + 0.05 | 5 | 40% |
| CaO | 0.08 + 0.02 | 2 | 75% |
| $K_2O$ | 0.65 + 0.05 | | |
| $Na_2O$ | 0.14 + 0.05 | | |
| MgO | 0.1 + 0.03 | | |
| Rational analysis | | | |
| Kaolinite | 60 | | |
| Quartz | 33 | | |
| Vitreous substances | 7 | | |
| Moisture | Reversion | | Whiteness |
| 15% | 4.6% | | 85% |
| Flexural strength | Shrinkage on firing | | Porosity |
| 20.2 kg/cm² | 9.2% | | 27.9% |

EXAMPLE 1

Three aqueous suspensions (0.5 l) made acid by sulphuric acid (concentration 1M) and each containing 40 g/l of suitably pulverized kaolin and 20 g/l of saccharose were heated while stirring to temperatures of 40° C. 50° C. and 60° C. respectively. Three samples were taken from each solution after 6, 24 and 48 hours, the results indicating the solution iron concentrations at the time of taking the respective samples being given in Table 2.

TABLE 2

| | Iron solubilization (ppm) | | |
|---|---|---|---|
| | Time (h) | | |
| | 6 | 24 | 48 |
| 40° C. solution | 79.8 | 148 | 370 |
| 50° C. solution | 430 | 707 | 687 |
| 60° C. solution | 289 | 650 | 590 |

As can be seen from the Table 2 data for 50° C. and 60° C., iron solubilization is complete after 24 hours.

The whiteness index of the solid residues from this treatment was then measured by the aforedescribed method, the results obtained being shown in Table 3.

TABLE 3

| | Whiteness index of solid residues after treatment | | |
|---|---|---|---|
| | Time (h) | | |
| | 6 | 24 | 48 |
| Residue from solution treated at 40° C. | 90% | 94% | 94% |
| Residue from solution treated at 50° C. | 95% | 95% | 96% |
| Residue from solution treated at 60° C. | 94% | N.D. | 96% |

N.D. = not determined

As can be seen from the data of Table 3, virtually complete decolorization is achieved after 24 hours, treatment at 50° C. having proved the quickest.

EXAMPLE 2

Example 1 was repeated using suspensions containing 300 g/l of suitably pulverized kaolin and different concentrations of hydrochloric or sullphuric acid, in the presence or absence of saccharose, at a temperature of 120° C. for 30 minutes. The results obtained are shown in Table 4, the awaited iron content being 3429 ppm.

TABLE 4

| | Iron in solution (ppm) | | |
|---|---|---|---|
| System | Ferrous iron | Ferric iron | Total iron |
| HCl 0.1 M | — | 53 | 81 | 134 |
| HCl 0.1 M + 0.2 g saccharose | 204 | 44 | 248 |
| HCl 0.1 M + 1 g saccharose | 414 | 40 | 454 |
| HCl 1 M | — | 3487 | 3434 |
| HCl 1 M + 0.2 g saccharose | 2438 | 596 | 3034 |
| HCl 1 M + 1 g saccharose | 2954 | 46 | 3000 |
| HCl 5 M | 41 | 3342 | 3383 |
| HCl 5 M + 0.2 g saccharose | 2058 | 720 | 2778 |
| HCl 5 M + 1 g saccharose | 2124 | 54 | 2178 |
| $H_2SO_4$ 0.05 M | 40 | 66 | 106 |
| $H_2SO_4$ 0.05 M + 0.2 g saccharose | 113 | 45 | 158 |
| $H_2SO_4$ 0.05 M + 1 g saccharose | 232 | 45 | 277 |
| $H_2SO_4$ 0.5 M | — | 1840 | 1781 |
| $H_2SO_4$ 0.5 M + 0.2 g saccharose | 885 | 1182 | 2067 |
| $H_2SO_4$ 0.5 M + 1 g saccharose | 2339 | 69 | 2408 |
| $H_2SO_4$ 2.5 M | — | 2459 | 2458 |
| $H_2SO_4$ 2.5 M + 0.2 g saccharose | 1962 | 607 | 2569 |
| $H_2SO_4$ 2.5 M + 1 g saccharose | 2425 | 65 | 2490 |

As can be seen, complete solubilization of the awaited iron resulted from treatment with 1M HCl. 2.5M sulphuric acid also gave very high solubilization. It is interesting to note the reducing action of the sugar, which transforms the ferric iron into ferrous, whereas in its absence the iron is present almost entirely in the form of ferric iron. As stated, converting the ferric iron into ferrous iron considerably facilitates the subsequent separation stages as the ferrous form is more stable in solution than the corresponding oxidized form.

EXAMPLE 3

100 ml of a 30% kaolin solution were treated with different $H_2SO_4$ concentrations in an autoclave at 120° C. in the presence or absence of saccharose (concentration 2%), samples being taken every 20 minutes to measure the presence of iron in solution. The results obtained are given in Table 5 (awaited concentration for total solubilization 3450 ppm).

TABLE 5

| | Iron in solution (ppm) | | | | |
|---|---|---|---|---|---|
| | Time (minutes) | | | | |
| | 20 | 40 | 60 | 80 | 100 |
| $H_2SO_4$ 9.06 mM | 20 | 35 | 45 | 54 | 61 |
| $H_2SO_4$ 9.06 mM + 0.22 g sacch. | 33 | 65 | 101 | 128 | 153 |
| $H_2SO_4$ 44.5 mM | 81 | 119 | 157 | 189 | 206 |
| $H_2SO_4$ 44.5 mM + 0.22 g sacch. | 106 | 210 | 335 | 451 | 558 |
| $H_2SO_4$ 227.3 mM | 551 | 869 | 1048 | 1207 | 1291 |
| $H_2SO_4$ 227.3 mM + 0.22 g sacch. | 672 | 1227 | 1794 | 2046 | 2194 |

As can be seen from the table, with sugar present and other conditions being equal, the iron concentrations in solution are higher. It can however be seen that at this temperature sulphuric acid concentrations of less than 0.25M were ineffective in promoting significant iron solubilization.

EXAMPLE 4

An examination was made of iron solubilization and total iron/ferric iron ratios in the presence of a reactive system of low acidity and low sugar concentration ($H_2SO_4$ 0.2M, saccharose 2 g/l), operating for different times on 30% kaolin suspensions at a temperature of 85° C. The results obtained are shown in Table 6.

TABLE 6

| | Time (h) | | | |
|---|---|---|---|---|
| | 3 | 4 | 20 | 23 |
| Fe total | 568 | — | 983 | 1081 |
| Fe 3+ | 451 | 496 | 541 | 508 |

As can be seen, at this temperature the extractive process is considerably retarded.

EXAMPLE 5

The extractive process described in the preceding examples was conducted with different reactive systems and using beet molasses as reagent instead of saccharose, at a temperature of 120° C. for a reaction time of 30 minutes. The awaited iron concentration in solution is 3429 ppm.

| | Iron in solution (ppm) | | |
|---|---|---|---|
| System | Ferrous iron | Ferric iron | Total iron |
| HCl 1 M | 200 | 3100 | 3300 |
| HCl 1 M + 0.2 g molasses | 2400 | 700 | 3100 |

| System | Iron in solution (ppm) | | |
| --- | --- | --- | --- |
| | Ferrous iron | Ferric iron | Total iron |
| HCl 1 M + 1 g molasses | 3130 | 20 | 3150 |
| H$_2$SO$_4$ 0.5 M | 200 | 1700 | 1900 |
| H$_2$SO$_4$ 0.5 M + 0.2 g molasses | 1150 | 1050 | 2200 |
| H$_2$SO$_4$ 0.5 M + 1 g molasses | 2570 | 30 | 2600 |

As can be seen, the results obtained with molasses, a waste product, are equal to or even better than those obtained with saccharose.

We claim:

1. A process for bleaching kaolin, quartz, titanium minerals and ceramic minerals, comprising suspending at least one ground material selected from the group consisting of kaolin, quartz, titanium minerals and ceramic minerals in a 0.1-5M solution of acid containing a sugar, stirring said suspension, and collecting the deferrized residue by filtration.

2. A process according to claim 1 wherein a concentration of the material to be bleached is up to 35% by weight of volume of said suspension.

3. A process according to claim 1 wherein the sugar is a sugar containing 5 or more carbon atoms, spent milk whey or beet molasses.

4. A process according to claim 3 wherein the sugar with 5 or more carbon atoms is glucose, fructose or saccharose.

5. A process according to claim 4 wherein the sugar is saccharose.

6. A process according to claim 5 wherein the sugar is present in a concentration of 0.5-4 g/l.

7. A process according to claim 1 wherein said suspension is heated while stirring.

8. A process according to claim 7 wherein said heat while stirring is a temperature between 20° C. and 120° C.

9. A process according to claim 8 wherein said process has a reaction time of up to 48 hours.

10. A process according to claim 9 wherein the acid is HCl.

11. A process according to claim 9 wherein the acid is H$_2$SO$_4$.

12. A process according to claim 8 wherein the acid is sulphuric acid in a concentration of 0.1-4M, the sugar is beet molasses, said temperature is 120° C. and said process has a reaction time of 30 minutes.

13. A process according to claim 8 wherein the acid is hydrochloric acid in a concentration of 0.1-5M, the sugar is beet molasses, said temperature is 120° C. and said process has a reaction time of 30 minutes.

* * * * *